UNITED STATES PATENT OFFICE.

REINHOLD GRIMME, OF LEIPSIC, GERMANY.

DIAPHANIE.

SPECIFICATION forming part of Letters Patent No. 564,613, dated July 28, 1896.

Application filed November 5, 1895. Serial No. 568,042. (No specimens.)

*To all whom it may concern:*

Be it known that I, REINHOLD GRIMME, a subject of the King of Saxony, residing at Leipsic, in the Kingdom of Saxony, German Empire, have invented certain new and useful Improvements in Diaphanies, of which the following is a full, clear, and exact description.

Hitherto two classes of diaphanies have been employed as imitations of stained glass, one consisting of chromolithographs printed on specially-adapted paper, rendered transparent and mounted on glass, and the other class consisting of transfer-pictures transferred to glass. The first class of pictures are transparent but not translucent, the second too translucent, so that the color effects, where very little color or shaded white or yellow appear, are almost invisible, owing to the light too powerfully penetrating the picture at such points, unless a backing or coating of some light color is inserted; but this, again, has the disadvantage that coating of this kind, such as a layer of albumen or ground-glass plate, possesses the disadvantage that the picture is not visible from the back. Thus, for instance, every chromo picture consists of light and dark scenic effects arranged in perfect harmony, and if such picture is transferred to a glass plate having a backing of paper, ground glass, aluminium, or the like the picture will have the proper effect. If, on the other hand, such picture is applied to plain glass, the film of color applied to the glass works effectively as far as the darker parts are concerned, but not with respect to the lighter parts. Thus a clouded sky will appear correct as far as the darker-blue color appears, but the white and clouded-white parts appear thin and watery and overpowered by the excess of light passing through such parts. The film of color is partly invisible at these points. The same is the case with a white or light robe or gown. The shading loses its effect at the light parts. In order to avoid these disadvantageous effects, I proceed in the following manner: After a certain number of the total number of colors to be printed has been applied I insert or apply an intermediate color, said color varying according to the nature of the picture. The said color may be white, opal, gray, or the like, and is applied advantageously to the whole surface of the picture after the first and before the last third part of all the colors is applied, *i. e.*, usually between the application of colors 5 to 10. The remaining colors are then applied in the usual manner. Pictures printed in this manner will be translucent, while all colors, to the finest and lightest shading, will stand out properly and the picture be visible from both sides. Transfer-pictures of this kind can also be employed for other purposes.

I claim as my invention—

1. A process for producing transfer-pictures for diaphanies, consisting in first printing a part of the number of the colors forming the picture, then covering the whole surface of the picture, with a translucent coating of indifferent color and then printing the remainder of the colors substantially as described.

2. Transfer-pictures for diaphanies having a coating of translucent indifferent color, applied between any two layers of the colors of the said picture substantially as described.

In testimony whereof I have signed my name to this specification in the presence of two subscribing witnesses.

REINHOLD GRIMME.

Witnesses:
RUDOLPH FRICKE,
OTTO DOEDERLEIN.